United States Patent [19]

Propp

[11] Patent Number: 5,043,065
[45] Date of Patent: Aug. 27, 1991

[54] VARIABLE DRAFT OIL/DEBRIS SKIMMING VESSEL

[76] Inventor: Carl F. Propp, 23590 S. Dayhill Rd., Estacada, Oreg. 97023

[21] Appl. No.: 559,829

[22] Filed: Jul. 30, 1990

[51] Int. Cl.⁵ .............................................. E02B 15/04
[52] U.S. Cl. ................................. 210/242.3; 210/923
[58] Field of Search ....................... 210/242.3, 776, 923

[56] References Cited

U.S. PATENT DOCUMENTS

| | | | |
|---|---|---|---|
| 2,876,903 | 3/1959 | Lee | 210/242 |
| 3,722,688 | 3/1973 | Wirsching | 210/242 |
| 3,756,414 | 9/1973 | Crisafulli | 210/242 |
| 3,822,789 | 7/1974 | Crisafulli | 210/242 |
| 4,054,525 | 10/1977 | Propp | 210/242 |
| 4,058,461 | 11/1977 | Gaw | 210/923 |
| 4,120,793 | 10/1978 | Strain | 210/923 |
| 4,554,070 | 11/1985 | Jordan | 210/923 |
| 4,588,501 | 5/1986 | Jordan | 210/923 |
| 4,795,567 | 1/1989 | Simpson et al. | 210/923 |

*Primary Examiner*—Stanley S. Silverman
*Assistant Examiner*—Christopher Upton
*Attorney, Agent, or Firm*—Eugene M. Eckelman

[57] ABSTRACT

A longitudinal oil, debris and water receiving main compartment has a forward inlet associated with a float operated skimmer. The vessel has buoyancy compartments that control operation of the vessel either at a deep draft skimming level or a shallow draft skimming level. These controllable buoyancy compartments also include controls for stabilizing the vehicle in the water. The vessel has a forward boom that adjusts to either the deep draft or shallow skimming modes. The vessels also has a collecting bail for debris and removal thereof.

4 Claims, 5 Drawing Sheets

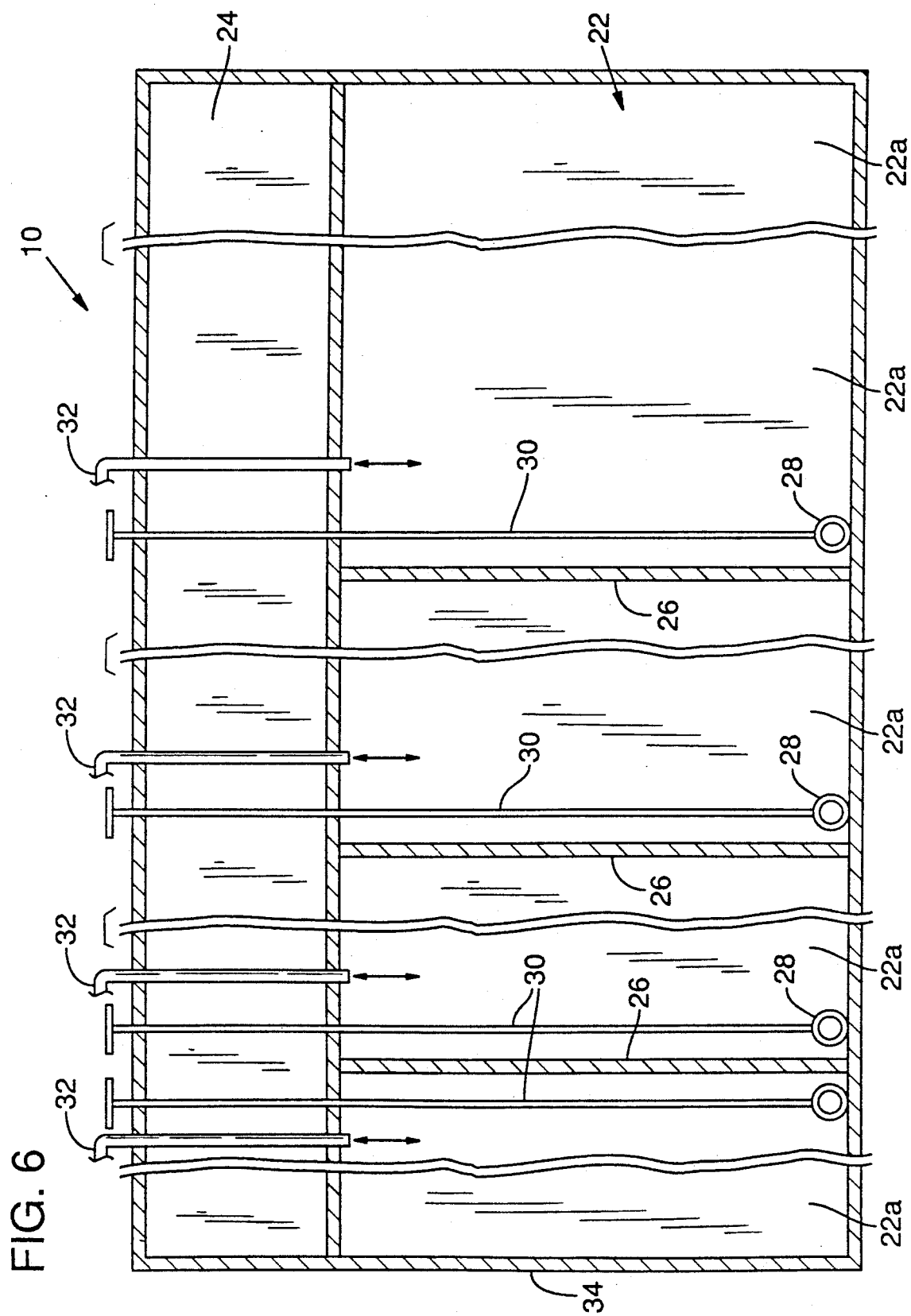

VARIABLE DRAFT OIL/DEBRIS SKIMMING VESSEL

BACKGROUND OF THE INVENTION

This invention relates to new and useful improvements in devices for skimming oil and debris from the surface of a body of water.

Various types of oil skimming devices have been conceived. As an example, my U.S. Pat. No. 4,054,525 shows a vessel that receives water and oil at its forward end upon movement of the vessel forward in the water or flow of water into the vessel. This vessel efficiently skims a controlled layer of water and oil from an oil spill and deposits the oil and water in a small compartment for separation and subsequent discharge into a storage vehicle. Other patents such as U.S. Pat. Nos. 3,722,688, 3,756,414 and 3,822,789 show skimming devices that employ small compartments for separating the oil from the water and discharge of the oil to a barge or the like. U.S. Pat. No. 2,876,903 shows an oil skimmer and separator vessel that skims and stores oil by depositing diffused oil into an open bottom compartment. Such vessel is capable of skimming at deep draft with minor draft adjustment.

As noted, most of the prior skimmers lack the ability to store substantially a full hold of oil and thus they need a mother vessel for frequent or continuous dumping. These small vessels generally encounter major problems in skimming and are inefficient because of their size. A skimming vessel capable of holding a large volume of skimmed oil, and debris and thus one that can add greatly to the efficiency of cleaning up an oil spill, confronts problems of stability and draft control, particularly in the open sea. This is because as the vessels fill, the draft and the stability thereof change and they are difficult to operate with any efficiency. Also, any prior device that can hold a substantial amount of skimmed oil has the disadvantage that it cannot work in shallow water areas including close to a beach.

SUMMARY OF THE INVENTION

According to the present invention and forming a primary objective thereof, an oil skimming vessel is provided that comprises a substantial improvement over prior structures in its versatility in operating to clean up accidental oil spills. It is another object of the invention to provide a vessel of this type that also picks up debris with the oil, A more particular object of the invention is to provide a vessel of the type described that is arranged to hold a substantially large volume of skimmed oil and debris so that dumping trips to a storage area is minimal. Another object is to provide a vessel of the type described that has a structural arrangement which facilitates operation in a deep draft mode for holding a large load of oil and debris and which can operate in a shallow draft mode to work in shallow water areas including close to a beach.

In carrying out the objectives of the invention, an oil and debris skimming vessel is provided that has a large longitudinal oil, debris and water receiving main compartment and inlet means to such compartment. Skimming means are provided at the forward portion of the vessel for directing skimmed oil, debris and water into the inlet means. Side compartments are provided some of which have means for filling and emptying them with water and air to provide a deep draft condition of the vessel that maintains a skimming level near the top of a main holding compartment for skimming in deep water and substantially filling the main compartment or a shallow draft condition of the vessel at least below the vertical center of the main compartment for skimming in shallow water areas. The skimming means are adjustable between upper and lower positions to provide the deep and shallow draft conditions of the vessel. The vessel is arranged for use with forward buoyant boom means which direct oil and debris into the skimming portion, the boom means being adjustable vertically to accommodate positioning of the vessel in deep or shallow draft modes. The invention will be better understood and additional objects and advantages will become apparent from the following description taken in connection with the accompanying drawings.

BRIEF DESCRIPTION OF THE DRAWINGS

FIG. 6 is a foreshortened longitudinal sectional view taken on the line 6—6 of FIG. 5 and also showing the side compartments.

DETAILED DESCRIPTION OF A PREFERRED EMBODIMENT

Figure 1:
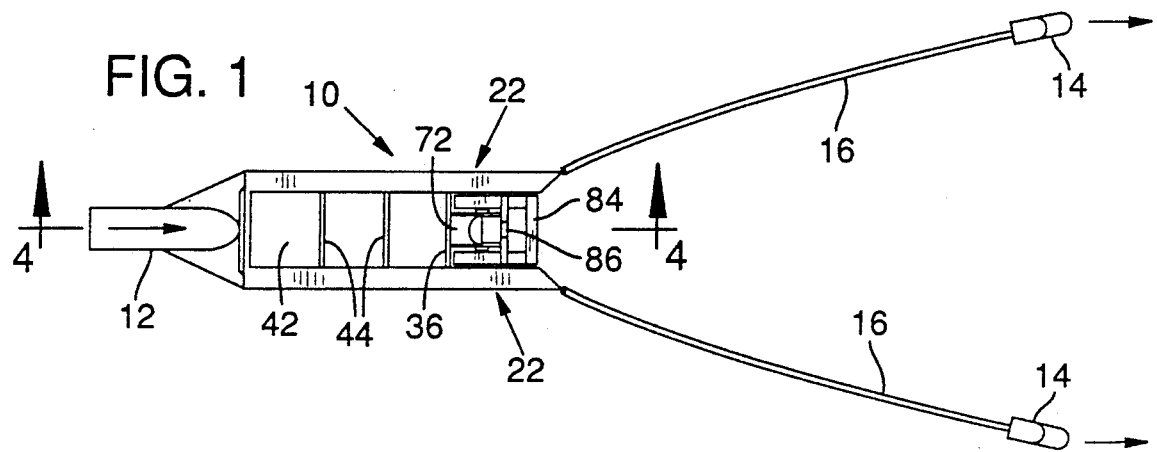
FIG. 1 is a diagrammatic top plan view of the present vessel and showing a use thereof out at sea in a deep draft mode.
Figure 2:
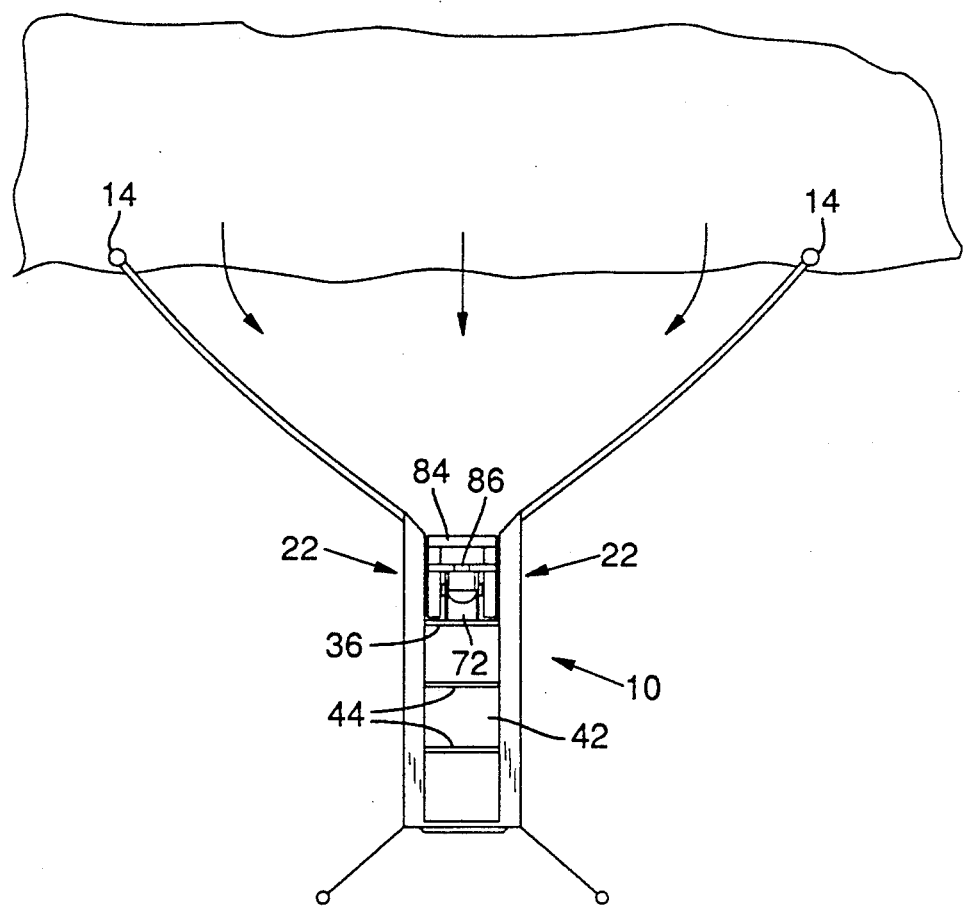
FIG. 2 is also a diagrammatic top plan view but showing the vessel in its use close to shore in a shallow draft mode.

With reference first to FIGS. 1 and 2, the vessel 10 is shown in its improved functions thereof. FIG. 1 illustrates the vessel in use in combination with a pushing vehicle 12 and guiding and/or tow vessels 14. Vessels 14 control the width of area to be skimmed in a pass of the skimming vessel 10 and have connection to vessel 10 by elongated buoyant booms 16. Booms 16 are conventional structure except that in the present arrangement they have vertical adjustable support, FIG. 3, on upright rods 18 at the forward end of the vessel 10. The rod connection of the booms 16 to the vessel 10 allows them to swing to various angles and also to adjust vertically between deep and shallow draft modes of the vessel, as will be more apparent hereinafter. In a preferred arrangement, the vessel is of rectangular configuration with the depth of the hull being approximately equal to its breadth and the length at least three times the breadth. The vessel can be of small size to work on small spills but its primary usefulness is for work on large spills wherein it can hold thousands of gallons of skimmed oil and debris.

Figure 3:
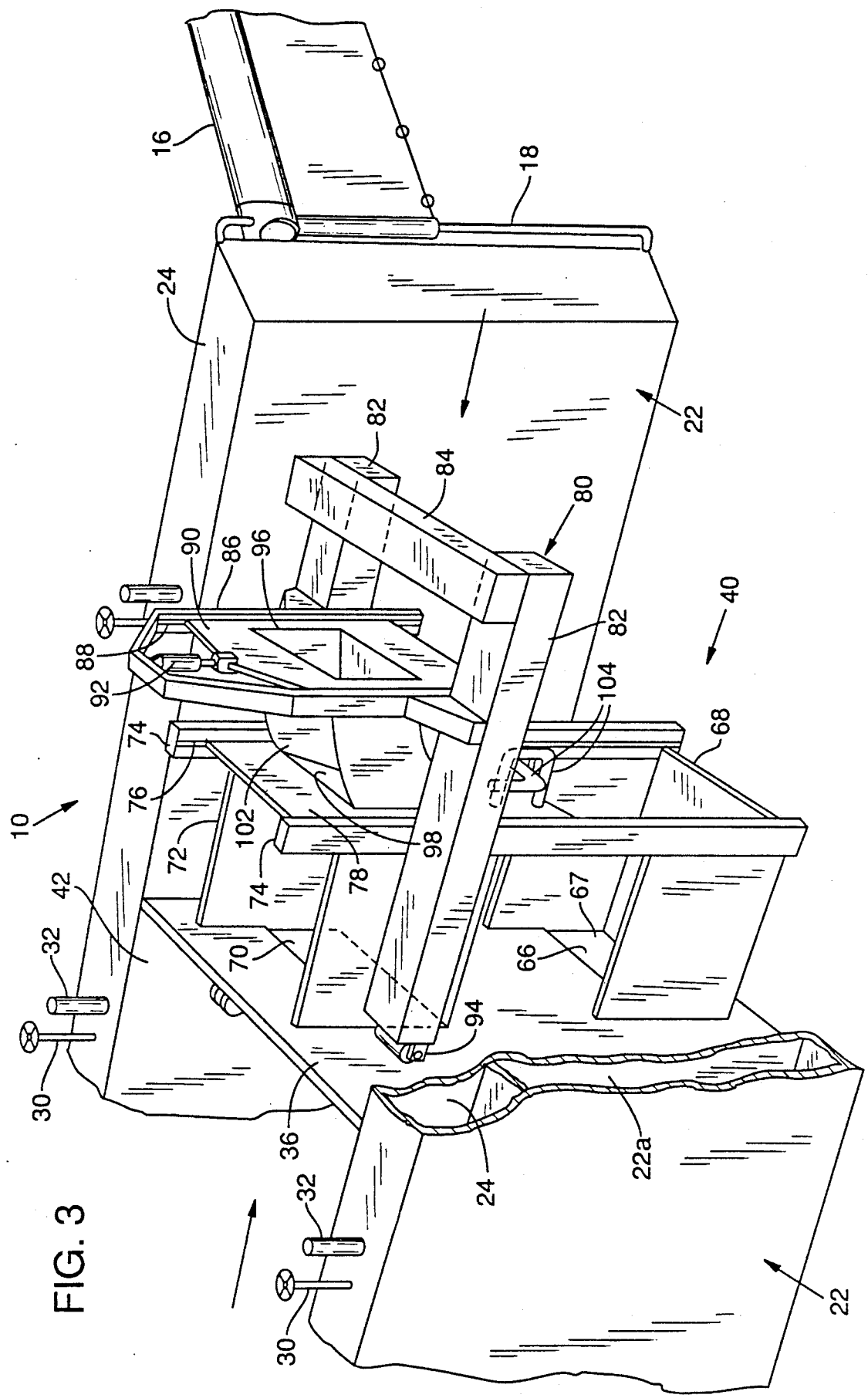
FIG. 3 is an enlarged fragmentary front corner perspective view showing forward structure of the vessel, a portion of this view being broken away to show internal structure.
Figure 5:
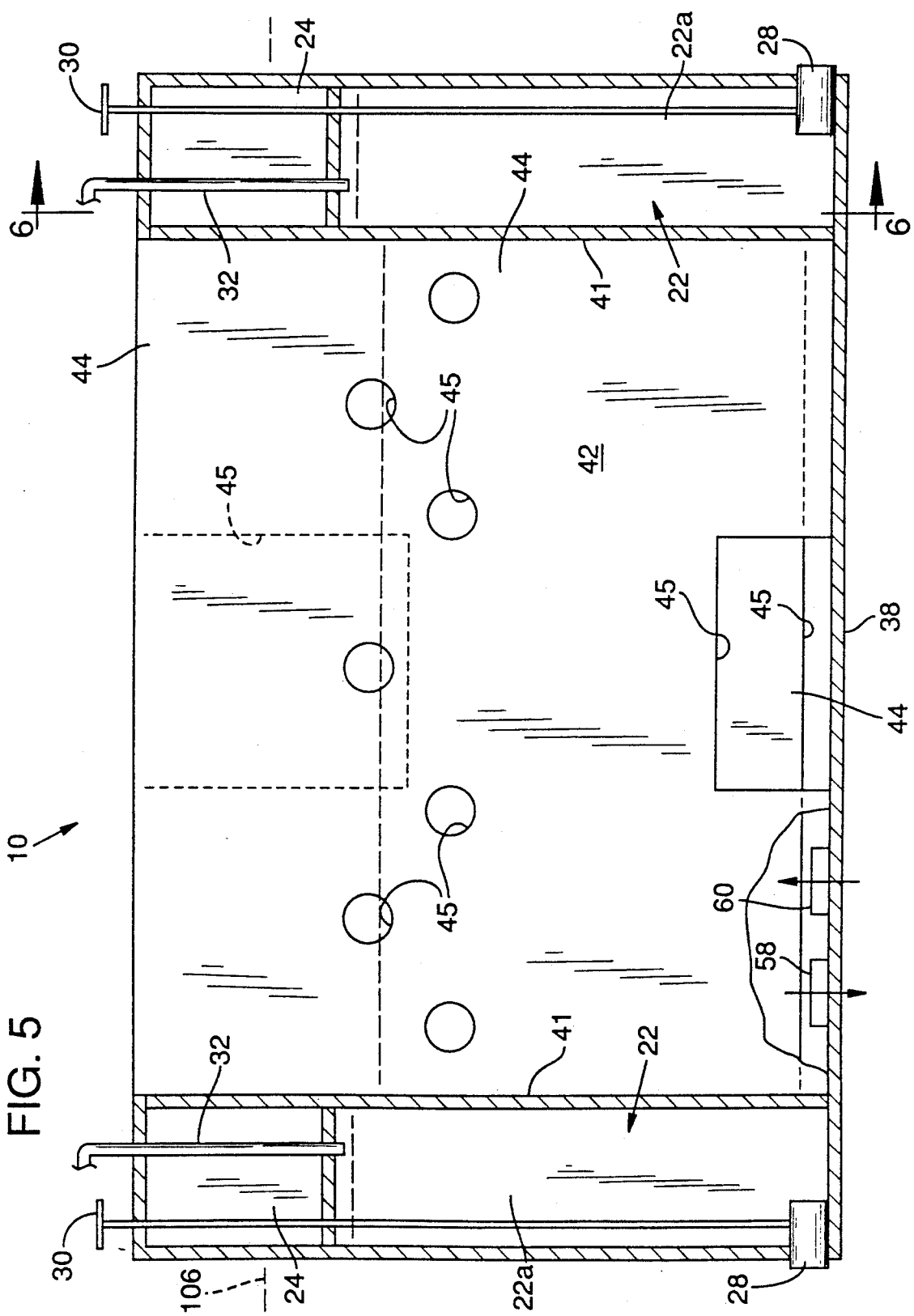
FIG. 5 is a cross sectional view taken on the line 5—5 of FIG. 4 and showing in particular the structure of the side compartments, a portion of this view being broken away.

The vessel has two watertight compartments 22 and 24 at each side, FIGS. 3, 5 and 6, that extend the full length from the forward end at the boom connection to the stern end. The compartments 22 comprise controlled lower water and air compartments in selected flotation and ballast functions and the compartments 24 comprise upper pontoon-like sealed air flotation compartments. Each compartment 24 is a single full length chamber compartment but compartments 22 have several cross watertight bulkheads 26 forming a plurality of individually controlled compartments 22a. The inlet and outlet of water to compartments 22a are controlled by bottom sea valves 28 connected to reach rods 30. The admittance of pressurized air to compartments 22a for forcing water from such compartments through sea valves 28 when opened is accomplished by air pipes 32. For flooding compartments 22a, air is vented through pipes 32 and sea water is allowed to enter sea valves 28.

Figure 4:
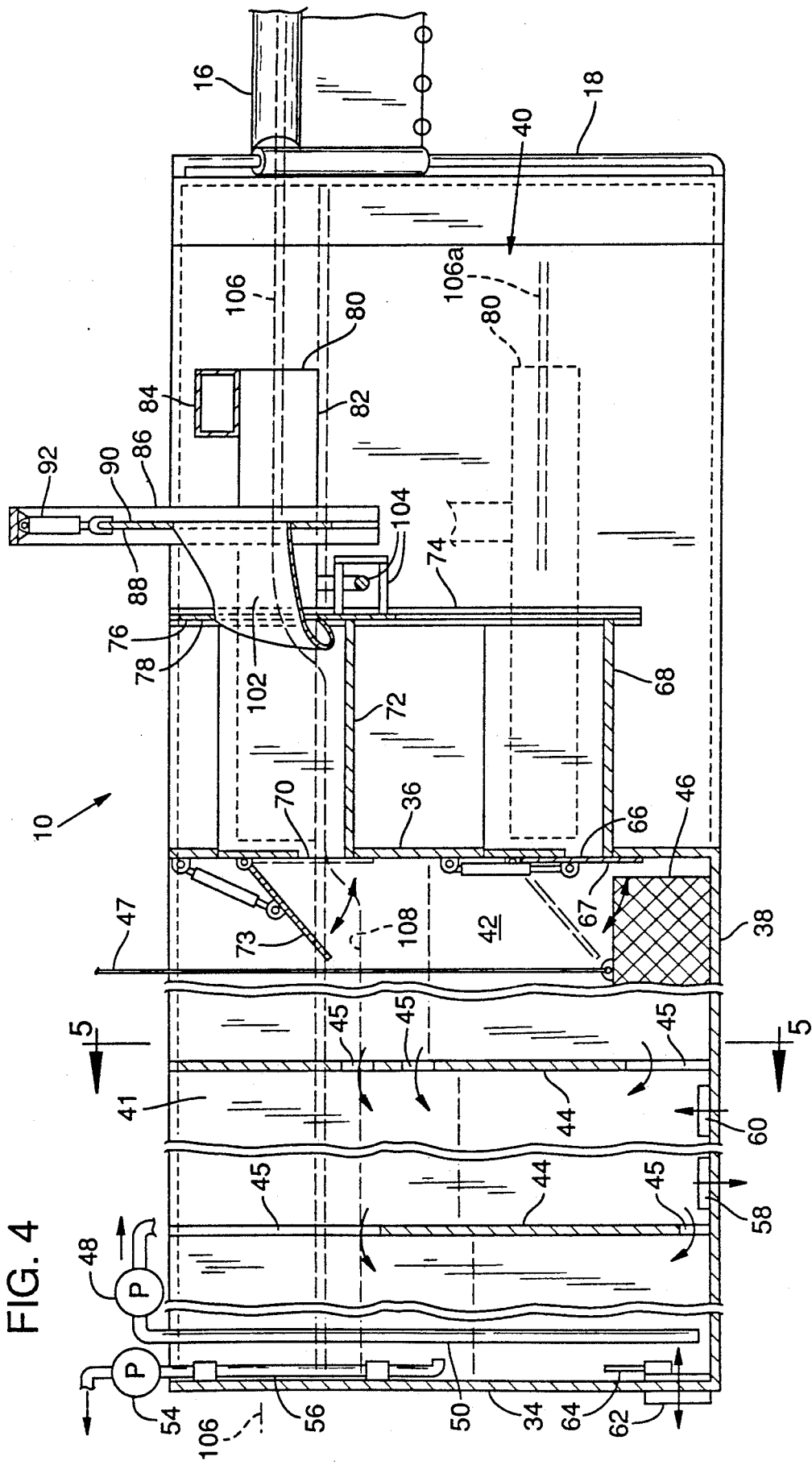
FIG. 4 is a foreshortened longitudinal sectional view taken on the line 4—4 of FIG. 1 and showing in particular the main holding compartment and skimming means.

The vessel has a stern shell structure 34, FIGS. 4 and 6, a bow shell structure 36 short of the forward end of the vessel, and a bottom shell structure 38 that forms a part of the side compartments 22 but which terminates at the bow shell structure 36, thus providing a front open oil, water and debris pickup area 40. The stern shell structure 34, the bow shell structure 36, bottom shell structure 38 and longitudinal watertight bulkheads 41, port and starboard, comprise sides for compartments 22 and form a main holding compartment 42 open at the top. This main compartment has two or more spaced transverse swash bulkheads 44 therein with openings 45 that facilitate the flow of a mixture of oil and water from a front portion of the compartment 42 and that separates the floating oil from the water as it progresses rearwardly to the rearwardmost portion of the main compartment. The debris remains in the forward compartment. The swash bulkheads restrict mass and sudden movement of the fluid in this compartment and also provide such separation of oil from the water in a well known manner. A removable screened debris bail 46 is located in the forward section of main compartment 42 and has lifting cable 47 attached thereto for lifting and emptying. The rearward portion of the main holding compartment 42 has a de-watering pump 48, FIG. 4, in an upright conduit 50 that extends from the bottom of the compartment to the exterior of the vessel. Also provided at this rearward portion of the compartment 42 is an oil transfer pump 54 in a vertical conduit 56 having its bottom inlet end terminating adjacent an upper portion of the compartment 42. The conduit 56 is capable of transferring collected oil to other holding means.

The bottom shell structure 38 of the compartment 42 is fitted with a pair of two-way pressure valves 58 and 60 that can be set to maintain a constant selected range of pressure between the inside of compartment 42 and the sea. These valves assure that the vessel has fore and aft stability by limiting the range of the contained water relative to the outside water level.

The stern shell structure 34 at the bottom has a flood valve 62 operable between open and closed positions by a reach rod 64 extending to the top of the vessel.

The bow shell structure 36 of the compartment 42 has a lower inlet 66 and power operated door 67 therefor. Inlet 66 has a channel-like snout chute 68, FIGS. 3 and 4, leading forwardly therefrom. Bow shell structure 36 also has an upper inlet 70 and power operated door 73 therefor. This inlet has a channel-like snout chute 72 leading forwardly. As best seen in FIG. 3, the snouts 68 and 72 are connected at the forward end by upright side frame members 74. These side frame members have opposed grooves 76 slidably receiving a plate or gate member 78 which tracks with the vessel under wave action and which as will be seen can move between the two snouts 68 and 72.

An independent water level tracking float 80, FIGS. 3 and 4, has side pontoons 82 held in rigid alignment by a forward cross frame member 84 and an upstanding arch-like frame member 86. This frame member has opposed grooves 88 supporting an inlet plate 90 with adjustable vertical movement in the grooves 88 by adjusting means 92, such as an hydraulic cylinder. The rearward end of pontoons 82 has roller assemblies 94 thereon, FIG. 3, providing a substantially friction free rolling engagement of the pontoons on the forward face of bow shell structure 36. The lateral spacing between the two pontoons 82 is sufficiently greater than the width of the snouts 68 and 72 so that not only can the float 80 travel up and down freely but also so that it can tilt sideways with the wave action, as will now be more apparent.

Plate 90 has an opening 96 therein and plate 78 has an opening 98. These two openings have a flow connection by means of a channel-like flexible apron 102. Apron 102 has its forward and rearward ends connected between the plates 78 and 90, and the flexibility thereof will allow a moderate vertical and horizontal relative movement between plates 78 and 90. A limit of this relative movement, however is provided by crossed interlocking loops 104 on members 78 and 80. Plate 78 is slidable between an association with the upper snout 72 and also with lower snout 68, whereby as will be seen this inlet plate will follow movement of the tracking float 80 between a deep draft skimming mode of the vessel and a lowered shallow draft skimming mode. Apron 102 forms an inlet spillway for skimmed oil as will be more apparent from the explanation of the operation.

OPERATION

In the use of the present skimming vessel, it is moved forwardly into the area to be skimmed, or if the water has a current or tide the apparatus may be anchored facing the current. The forward booms 16 are generally employed for directing oil and debris if any into the skimming means, such booms being maintained selectively by forward vessels or anchors 14, together with a vessel 12 at the stern if the skimmer is to be driven.

It will first be decided whether the vehicle is to skim in a shallow draft mode, wherein the tracking float 80 will position itself adjacent the snout 68, or whether the vessel is to skim in a deep draft mode wherein the tracking float 80 will position itself adjacent the snout 72. As the tracking float moves between these skimming modes, the rearward apron supporting plate 78 moves therewith. That is, interlocking loops 104 allow a small relative movement of the apron holding plate 90 and the float 80 in tracking levels of the float resulting from an uneven water surface but such loops limit movement between the float and the plate 78 and relieve the apron of forces that result when the float is shifting between deep and shallow draft modes or in the event that the skimmer confronts a large wave or the like. The apron 102 allows independent buoyant movement of the float 80 both vertically and horizontally relative to the vessel to maintain uniform flow over the apron even though the water surface is surging and billowing, the side clearance between the pontoons and the snouts allowing the float 80 to move freely with the water surface. The force of the water under the apron in area 40 holds it sufficiently rigid to form a spillway thereover. Inlet plate 90 can be adjusted vertically by hydraulic cylinder 92 to set the inlet opening 96 to the desired depth or cut of skimmed oil, debris and water. The depth of cut may be set so that debris in the oil will be sure to flow over the spillway and not collect out front.

In initial operation of the present invention wherein the vessel is being moved to the oil spill sight, main compartment 42 and port and starboard flotation-ballast compartments 22a are empty. Inlet doors 67 and 73 are closed as is flood valve 62. Air flotation compartments 24 are unregulated and will always maintain buoyancy of the vessel even when the compartment 42 is full and the flotation-ballast compartments 22a are water ballasted in an amount to put the vessel in a deep draft mode.

When the vessel is to be operated in a deep draft mode, inlet doors 67 and 73 remain closed, flood valve 62 and valves 28 are opened. The ballasting resulting from water in the side flotation-ballast compartments 22a and the compartment 42 causes the vessel to settle to a deep draft mode with the entire buoyancy of the vessel being supplied by the side air flotation compartments 24. The inside water level is now the same as the outside water level. The outside water level is designated by the numeral 106 in FIG. 4. The tracking float 80 and plate 78 have automatically moved up to a point just above the bottom of snout 72.

To begin a deep draft skimming operation, flood valve 62 and control valves 28 are closed. De-watering pump 48 is started and controlled with the help of two-way pressure valves 58 and 60 to bring the inside water level in compartment 42 to a point, such as 3 to 12 inches, below the outside water level. This minus level is designated by the numeral 108 in FIG. 4. Two-way pressure valves 58 and 60 are capable of manual setting to assist in maintaining the desired minus inside water level at 108.

Door 73 is now opened and a cut of oil, debris and water from the pickup site floats into main compartment 42 over the spillway 102. As the skimming operation continues, the compartment 42 tends to fill with oil and water. During this process, de-watering pump 48 is running to remove water in metered amounts from the bottom of the main holding compartment 42 and controlled with the help of pressure valves 58 and 60 to maintain the small minus level of fluid in the compartment 42. Swash bulkheads 44 and the openings 45 therein cause the oil to separate from the water in a conventional manner. The skimming operation continues at this minus inside level until the compartment 42 is about 90% full of oil or when de-watering pump 48 starts to discharge oil. At this time inlet door 73 is closed and de-watering pump 48 is stopped.

In off-loading the collected oil and debris, the oil is pumped out from the main holding compartment by pump 54 and debris removed by means of the bail 46. At the same time, ballast water is removed from the side flotation-ballast compartments 22a by pressurizing compartments 22 and purging water out through valves 28. At the finish of this operation valves 28 are closed. Main compartment 42 and side flotation-ballast compartments 22 are completely empty and the vessel is floating in its light draft mode. It is ready to start the oil skim operation over again.

If it is desired that the vessel be operated in the shallow draft mode, inlet door 67 is opened and flood valve 62 opened allowing water to flow into the main holding compartment 42. Compartment 42 loses its buoyancy and the vessel settles into the water to its shallow draft mode. The entire buoyancy of the vessel is now being accomplished by port and starboard flotation-ballast compartments 22. The inside and outside water levels are the same at this time and the tracking float 80 and spillway 102 automatically positions itself at snout 68. Booms 16 also automatically follow this change of vessel draft.

To begin the shallow draft mode, flood valve 62 is closed and de-watering pump 48 is started and controlled with the help of pressure valves 58 and 60 to maintain a minus range inside level relative to the outside level, as in the deep draft mode, wherein a selected cut of oil and water flows into compartment 42 over spillway 102 but at snout 68, as seen in broken lines in FIG. 4. The outside water level in this shallow draft mode is designate by the numeral 106a. When the skimming operation is completed in the shallow spill area, inlet 67 is closed and the pump 48 is stopped.

The present invention thus is extremely versatile in that it can be controlled and operated in shallow water such as close in to beaches. Also, it can be controlled to operate in a deep draft mode. In this latter mode, the main holding compartment can be substantially filled whereby to hold a large volume of oil in a barge-like capacity to limit the number of trips to an unloading dock or to a mother ship. This is extremely important to save time in an oil spill that threatens land. The vessel is very stable in the water resulting from air flotation compartments 24 and selected control of water and air in flotation-ballast compartments 22a by suitable operation of bottom valves 28 and air pipes 32, namely, the air or water volume individually in compartments 22a or in their entirety can be controlled by the operator to provide proper skimming water levels and to stabilize the vessel in the water. The pressure regulating valves 58 and 60 assist in maintaining the inside and outside water levels close to the desired range, thus reducing the water-tight integrity needed in the transverse swash bulkheads necessary to maintain an acceptable degree of forward and aft stability.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An oil skimming vessel comprising:
   a longitudinal oil and water receiving compartment having forward, rearward, and side portions,
   an inlet at the forward portion of said compartment including vertical opening means and chute means projecting forwardly from said opening means and having a forward end,
   a first gate member at the forward end of said chute means that tracks vertically with said vessel under wave and draft changing conditions,
   a second gate member forward of said first gate member,
   a float having forward and rearward ends and supporting said second gate member,
   said chute means projecting to a point intermediate the forward and rearward ends of said float whereby said float and said second gate member selectively track wave action independently of the vessel in both vertical and horizontal directions, flexible means connected between said first gate member and said second gate member allowing said float and said second gate member to track wave action, said flexible means forming a spillway directing the inflow of skimmed oil and water from said second gate member to said first gate member and into said inlet and at the same time allowing said independent movements of said float relative to the vessel, buoyancy means on said vessel, means controlling operation of said buoyancy means providing variable draft conditions of the vessel, said first gate member being vertically adjustable to accommodate said varying draft conditions, and oil and water removal means associated with said oil and water receiving compartment.

2. The oil skimming vessel of claim 1 including supporting, actuating and limiting means connected between said float and said first gate member controlling the relative supporting, actuating and limited movement between said float and said first gate member.

3. The oil skimming vessel of claim 1 including closure means associated with said inlet controlling flow of skimmed oil through said inlet.

4. The oil skimming vessel of claim 1 including vertical adjustment means operably connected to said second gate member arranged to selectively vary the depth of skim over said spillway.

* * * * *